United States Patent
Herry et al.

(10) Patent No.: US 9,258,162 B2
(45) Date of Patent: Feb. 9, 2016

(54) METHOD AND SYSTEM FOR DESYNCHRONIZING CHANNELS IN MULTI-CARRIER COMMUNICATION SYSTEMS

(71) Applicant: THALES, Neuilly-sur-Seine (FR)

(72) Inventors: Sebastien Herry, Gennevilliers (FR); Sylvain Traverso, Gennevilliers (FR); Catherine Lamy-Bergot, Gennevilliers (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/075,657

(22) Filed: Nov. 8, 2013

(65) Prior Publication Data
US 2014/0133588 A1 May 15, 2014

(30) Foreign Application Priority Data
Nov. 9, 2012 (FR) .................................... 12 03015

(51) Int. Cl.
*H04K 1/10* (2006.01)
*H04L 27/26* (2006.01)

(52) U.S. Cl.
CPC ........ *H04L 27/2621* (2013.01); *H04L 27/2614* (2013.01)

(58) Field of Classification Search
CPC ................... H04L 27/2621; H04L 27/2614
USPC ......... 375/260, 150, 267, 141, 295, 316, 347; 370/331, 252, 311, 473, 328, 208, 329
See application file for complete search history.

(56) References Cited

U.S. PATENT DOCUMENTS

| | | | |
|---|---|---|---|
| 2009/0201902 A1* | 8/2009 | Miki et al. | 370/342 |
| 2010/0266058 A1 | 10/2010 | Murakami | |
| 2012/0309330 A1 | 12/2012 | Lamy-Bergot et al. | |
| 2013/0136038 A1* | 5/2013 | Spagnolini et al. | 370/280 |

FOREIGN PATENT DOCUMENTS

| | | |
|---|---|---|
| FR | 2968149 A1 | 6/2012 |
| FR | 2981232 A1 | 4/2013 |
| WO | 2009/082173 A2 | 7/2009 |
| WO | 2013053703 A1 | 4/2013 |

OTHER PUBLICATIONS

Yanyan Zhang, et al., "A Novel timing Synchronization Method for Distributed MIMO-OFDM Systems in Multi-path Rayleigh Fading Channels", Vehicular Technology Conference, May 11, 2008, pp. 1443-1447, IEEE, Piscataway, NJ, USA, XP031255804.

Hui-Li Fan, et al., "A Robust Timing and frequency Synchronization Algorithm for HF MIMO OFDM Systems", 2010 Global Mobile Congress, Oct. 18, 2010, pp. 1-4, IEEE, Piscataway, NJ, USA, XP031800629.

Chen Hong, et al., "Application Research of Technology Combining AMC and OFDM in HF Communication Systems", 2010 6th International Conference on Wireless Communications Networking and Mobile Computing, Sep. 23, 2010, pp. 1-6, IEEE, Piscataway, NJ, USA, XP031774492.

Wikipedia, "High Frequency," last modified Jun. 4, 2004, accessed Apr. 15, 2015 <http://web.archive.org/web/20040701041133/http://en.wikipedia.org/wiki/High_Frequency>.

* cited by examiner

*Primary Examiner* — Dhaval Patel
(74) *Attorney, Agent, or Firm* — Baker Hostetler LLP

(57) ABSTRACT

A method and system are provided for reducing the peak factor in a multi-carrier communication system, the data being transmitted on m channels comprising, in the transmission of data in the form of a frame, a step in which a number d of desynchronization symbols are introduced at the start of each of the frames, the number d being chosen as a function of the transmission channel number concerned.

8 Claims, 3 Drawing Sheets

METHOD AND SYSTEM FOR DESYNCHRONIZING CHANNELS IN MULTI-CARRIER COMMUNICATION SYSTEMS

CROSS-REFERENCE TO RELATED APPLICATION

This application claims priority to foreign French patent application No. FR 1203015, filed on Nov. 9, 2012, the disclosure of which is incorporated by reference in its entirety.

FIELD OF THE INVENTION

The object of the present invention relates to a method and a system for reducing the peak factor ratio in a multi-carrier communication system. The method is used, for example, in a high frequency HF communication system.

In the present description, the words path or channel are employed interchangeably to denote a data propagation and transmission channel.

BACKGROUND

HF links notably offer a capacity outside of the line of sight or BLOS which makes it possible to implement long or even very long haul communications without requiring the use of a satellite.

The technical context of the present invention relates, more particularly, to the use of a plurality of HF channels (so-called multi-carrier usage) as proposed in the standard MIL STD 188-110B Annex F known to a person skilled in the art, in which is described the use of two 3 KHz or general-purpose carriers described in the patent application filed by the Applicant under the No FR 10/04650 which proposes considering the use of a plurality n of conventional channels or paths with a typical width of 3 KHz bandwidth or more, that can also be channels such as those proposed in the standard MIL STD 110-188C Annex D, with bandwidths of 3, 6, 9, 12, 15, 18, 21 or 24 kHz.

The long-haul communication capability (in BLOS mode) of the HF links relies on the reflection of the HF waves (which range typically from 2 to 30 MHz) on the layers of the ionosphere, layers whose qualities are not stable in time and in space, which leads to strong propagation channel variations. To this channel instability is also added the ever-present possibility of different interfering factors, intentional or otherwise, in particular at night when the usable part of the HF spectrum is less great.

Despite its instability, the channel offers the interest of allowing for long-haul communications without it being necessary to first deploy a complicated or costly infrastructure, unlike satellite communications for example. When its better stealth is also considered, this explains why the professionals are seeking to increase the bit rates offered on the HF links. A solution has been proposed in the abovementioned patent application for considering the use of a plurality n of 3 KHz channels, contiguous or not, in order to achieve higher useful bit rates (above 20 kb/s) for the users of the HF band.

According to Shannon's theorem, the bit rate can be augmented either by augmenting the spectral efficiency or by augmenting the band used. At the present time with the HF systems already operating with high spectral efficiency, the decisive gain is expected of bandwidth augmentation strategies. Two main approaches can be envisaged:

- a widening of the standard channel structure, as proposed in the standard MIL STD 188-110 revision C which provides for the use of channels up to 24 KHz bandwidth,
- the use of a plurality of standard channels, typically 3 KHz, concatenated in order to constitute a sufficient bandwidth, as proposed in the Applicant's two patent applications FR 10 04560 and FR 11 03083. This approach is compatible with the use of widened channels, since such channels can also be concatenated.

The first approach raises the problem of the availability of the bandwidth, and the lower efficiency in the case of operation on a partially occupied band.

The second approach, which makes it possible to select channels of good quality, raises the problem of the peak factor, that is to say the variation of the amplitude of the signal, between its maximum value (peak) and its average value. Also traditionally referred to is the ratio between the peak value and the average value (or Peak-to-Average Power Ratio, PAPR) for operating correctly with the power amplifier.

One technical problem that is posed is therefore as follows: how to limit the peak factor of a multi-carrier wave form to allow for an effective use of unconnected bands for one and the same HF or other wide band link and therefore to allow for the use of multi-carrier wave forms that are compatible with the current spectral allocations in the HF band or for other frequencies.

The state of the art on the issue of reducing the peak factor, as known to the Applicant, proposes different techniques cited hereinbelow.

A first technique is to use single-carrier solutions having a lower back-off factor than multi-carrier solutions. These single-carrier-based solutions prove complex to equalize in high bandwidth cases. Typically, it is currently difficult to produce an equalizer on an ionospheric HF channel with good performance levels beyond a useful bandwidth of 12 KHz. They also pose the problem of the availability of the bandwidth concerned, the use of a single-carrier requiring a contiguous allocation, whereas, in multi-carrier cases, it is possible to envisage the use of a set of non-contiguous sub-bands, as is described in the abovementioned patent application FR 10 04560.

Another technique is the use of modulations with low peak factors, of continuous phase modulation, or CPM, type. These solutions pose the problem of their significant spectral width, high shoulders, and therefore their non-conformity to the standard radio masks, save by requiring very high spectral occupancies, which are not envisaged currently in HF mode.

Another technique is the use of clipping solutions. The main fault with these techniques is that they degrade the signal. With the signal having been degraded by the clipping and filtering operations, the performance levels are naturally degraded, this degradation generally being corrected by the function-adapted correcting coding in conjunction with a cost in terms of transmitted useful bit rate.

The use of coding-based solutions makes it possible to effectively reduce the power dynamic of the signal. However, the major drawback with these solutions is the reduced spectral efficiency naturally induced by the coding techniques.

The signal addition-based solutions are effective for reducing the power dynamic of the signal. Numerous solutions exist in this field, their main defect being that they degrade the energy yield of the transmitter because the added signal does not convey any useful information.

Another technique is to use constellation extension-based solutions. These solutions by definition modify the constellation to be transmitted, thus modifying the Euclidian distance between the points of the reference constellation. Consequently, the performance levels are naturally degraded.

Other, more basic solutions, such as reducing the amplification power or working with modulations with a lower peak factor, such as phase shift keying (PSK) instead of quadrature amplitude modulation (QAM) involve greatly reducing the useful bit rate that can be offered and are therefore not retained.

The prior art solutions do not therefore make it possible to obtain a reduction of the peak factor without degrading the signal, using a greater bandwidth or modifying the transmitted signal.

SUMMARY OF THE INVENTION

The method according to the invention relies notably on the introduction of an offset, notably in the form of desynchronization symbols, between the different channels of the multi-carrier wave form, in order to avoid having the channels in phase notably for the pilot symbols and thus resulting in an excessively high peak factor.

The invention relates to a method for reducing the peak factor in a multi-carrier communication system, the data being transmitted on m channels, characterized in that it comprises at least the following steps: in the transmission of data in the form of a frame comprising a synchronization preamble, introducing a number d of desynchronization symbols at the start of each of the frames, the number d being chosen as a function of the transmission channel number m chm concerned, the desynchronization symbols introduced being different for the m channels.

According to a variant embodiment, a number d of desynchronization symbols equal to 0 are introduced before the initial synchronization preamble of the frame transmitted on the first channel and a number d of desynchronization symbols equal to m−1 are introduced on the channel chm.

The method introduces random symbols with a different number d for each channel.

The method can comprise, in the reception step, a step of realigning a channel by taking into account the number d of symbols introduced into a frame.

According to one embodiment, the method comprises a common step of coding and interleaving of the data on the m channels.

The communications implemented are HF waves of 2 to 30 MHz.

The invention also relates to a system for reducing the peak factor in a multi-carrier communication system, comprising a data transmission subsystem and a reception subsystem, the system comprising m channels for transmitting data in the form of frames comprising, in the transmission subsystem, at least one module for framing the data adapted to insert a number m of symbols at the start of each data frame, said symbols being adapted to introduce an offset between the different channels of a multi-carrier wave form, the number d being chosen as a function of the channel number $ch_n$ concerned, the desynchronization symbols introduced being different for the m channels.

The system can comprise, in the reception subsystem, a module adapted to realign each channel by using the number of symbols introduced into a frame.

BRIEF DESCRIPTION OF THE DRAWINGS

Other features and advantages of the device according to the invention will become more apparent on reading the following description of an exemplary embodiment given as an illustrative and nonlimiting example with appended figures in which.

DETAILED DESCRIPTION

Figure 2:
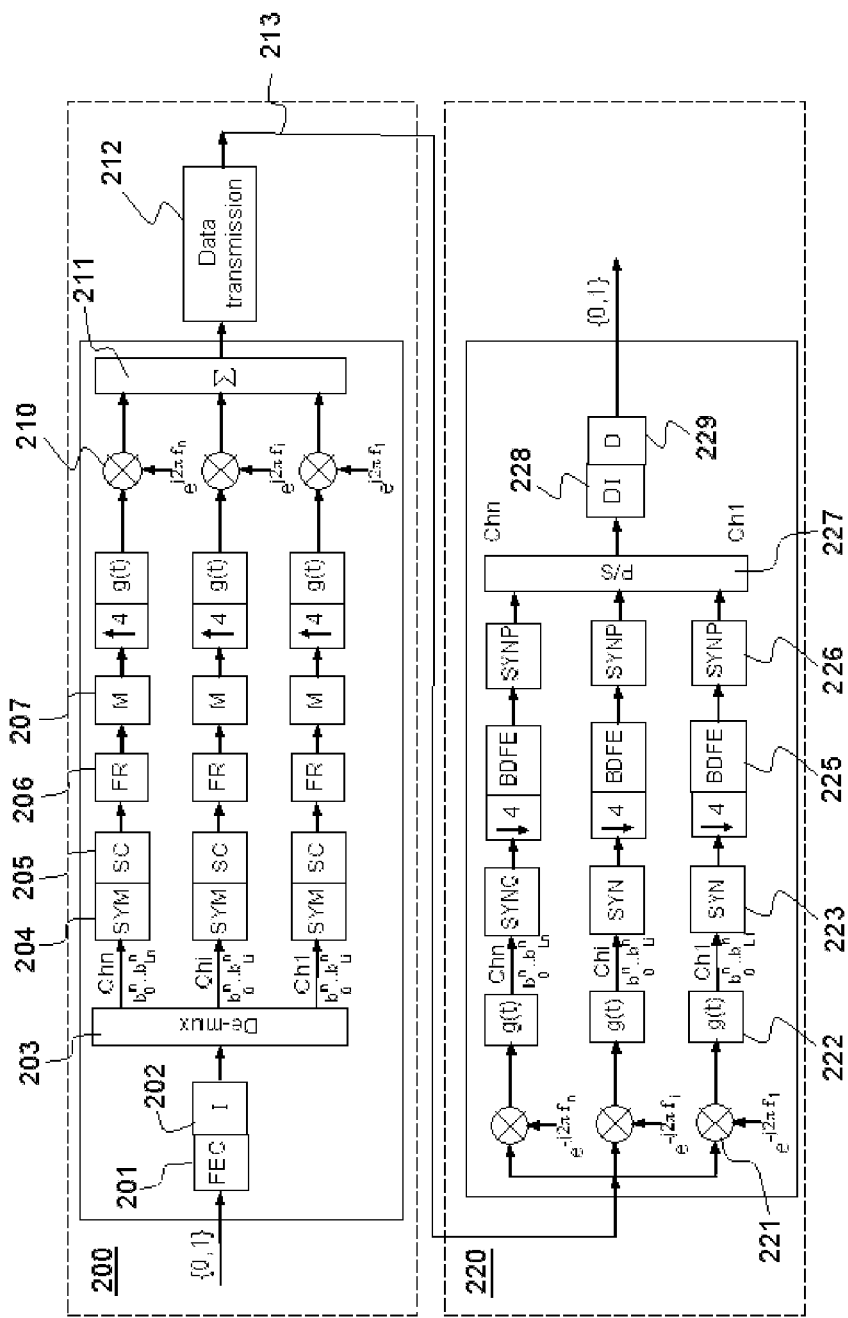
FIG. 2 represents an exemplary architecture of a system for transmitting and receiving, based on the architecture of a solution according to the patent application filed by the Applicant under the No FR 11/03083.
Figure 3:
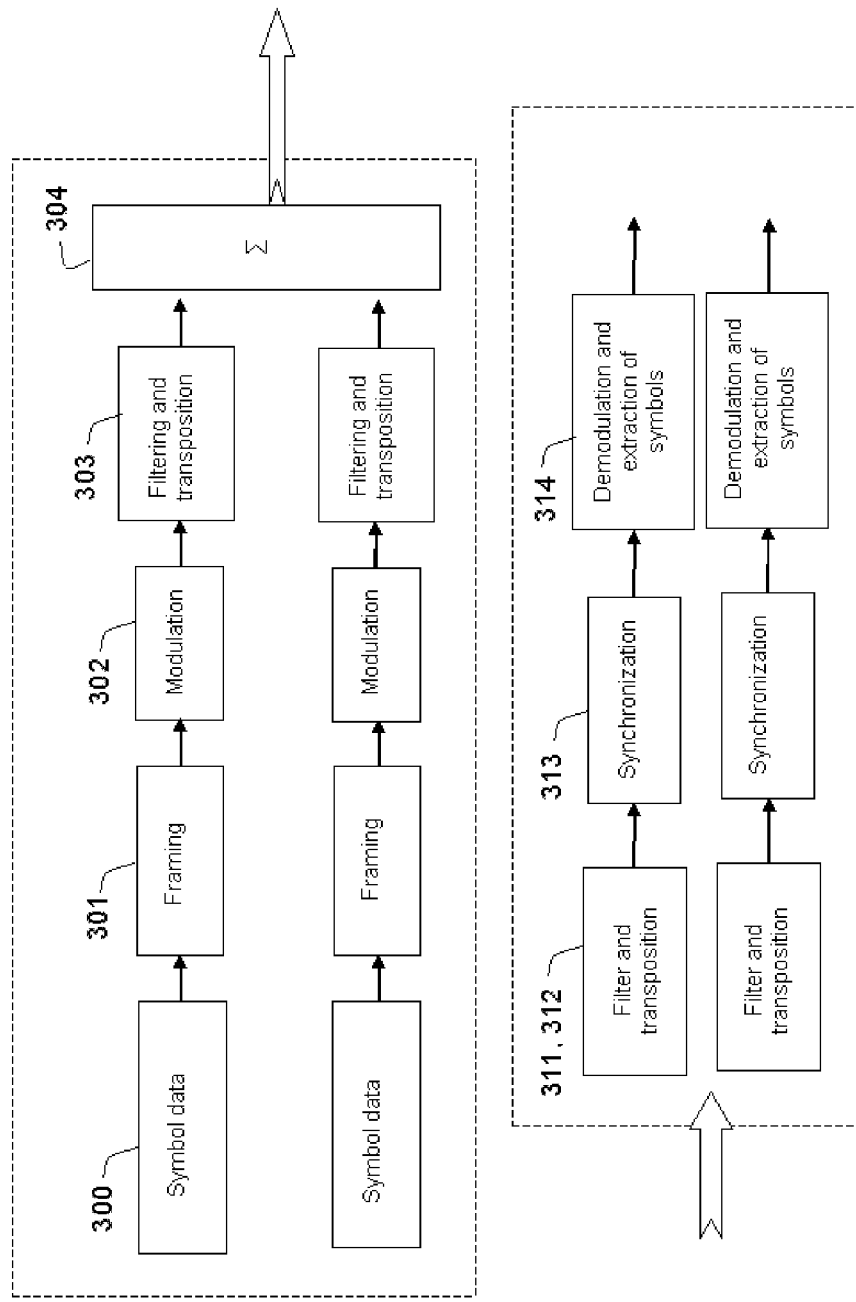
FIG. 3 represents a variant of FIG. 2, presenting the proposal in a more generic context.

In the following description of the figures, different abbreviations are used. In the transmission subsystem, in FIGS. 2 and 3, the references used mean: FEC: error correcting code, I: interleaving, SYM: the formation of symbols, FR: the framing step, M: the modulation step; the step SC for scrambling. The references used in the reception subsystem in FIGS. 2 and 3 are: g(t) filtering, SYN: synchronization, BDFE: frame equalization step, SYNP: synchronization prediction, DI: de-interleaving, D: data decoding.

Figure 1:
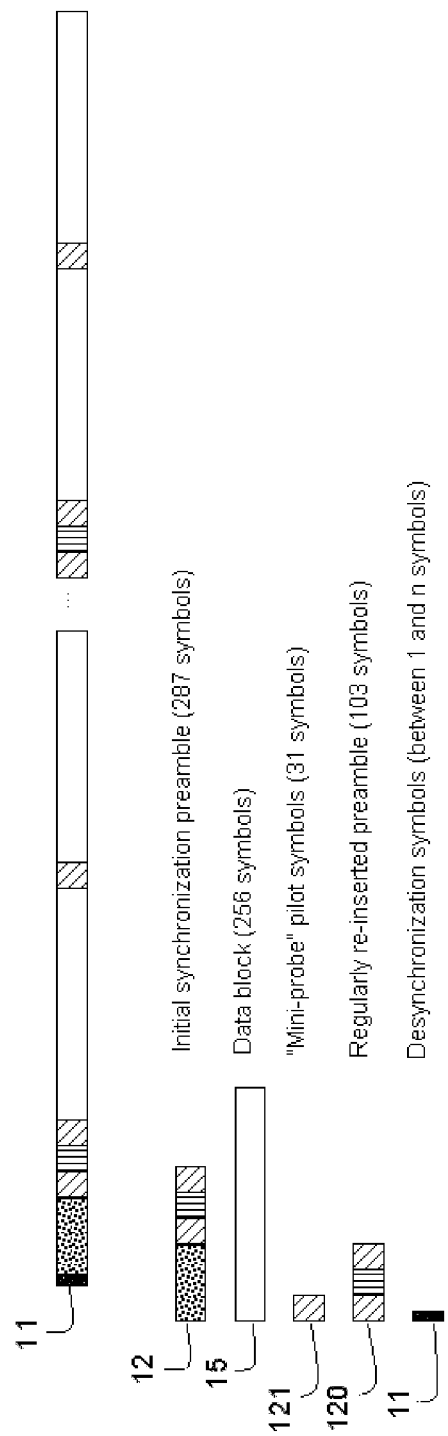
FIG. 1 represents an exemplary frame structure for implementing the method according to the invention.

FIG. 1 schematically represents an exemplary frame structure in which additional symbols have been introduced, randomly, for example, the number of symbols being different for each radio channel used in the communication system or at least for most of the channels. The additional symbols are designated as desynchronization symbols whose function is notably to introduce an offset between the different channels of a multi-carrier wave form. The desynchronization symbols are chosen, for example, from the same constellation as the symbols used for the synchronization.

The example of FIG. 1, which presents a conventional frame format according to STANAG 4539 or MIL STD 188-110C, represents a frame in which a block of desynchronization symbols has been added. Each channel is assigned a different number of desynchronization symbols, for example between one and n, where n is the maximum number of carriers considered. As an example, introducing an additional desynchronization symbol on a channel m relative to the preceding channel m−1 amounts to offsetting each channel m relative to the preceding channel m−1.

The frame consists of a first block of desynchronization symbols 11, followed by an initial synchronization preamble 12, consisting of a regularly re-inserted preamble 120, for example 103 symbols, comprising a block of pilot symbols 121 that will be found to be distributed in the frame, and a data block 15. The desynchronization symbol or symbols 11 are in practice introduced before the initial synchronization preamble 12 so that the (identical) preambles on the different channels are desynchronized. Notably, the introduction of desynchronization symbols will prevent the pilot symbols from being in phase and resulting in an excessively high peak factor.

The offset induced in the transmission of the data frame is made up on the sending side, for example by realigning each channel, or through the action of the equalizer of the receiver which processes this offset as the impact of a multi-path. Since the object of the introduction of the desynchronization symbols is to offset the sequences common to the different channels, there is a benefit, in terms of efficiency, that the desynchronization symbols introduced are not simply a copy of one and the same unique symbol. It is in fact recommended to introduce random symbols (drawn, for example, as a function of the number of the channel considered) belonging to the constellation used for the preamble block 12. Another possibility is to predefine the desynchronization sequences whose properties will have been verified beforehand.

Since the data symbols are, in essence, symbols that vary from one channel to another, the introduction of the desynchronization that is proposed here will not have any specific impact on the data part, even in the case where the channels would be modulated with different modulations.

The number of desynchronization symbols is different on each of the channels. The number of symbols added is chosen so as not to introduce unnecessary delay, nor ultimately exceed the capabilities of the system equalizer.

The manner in which the number of data symbols introduced is chosen can be a linear variation, for example; {channel 1 has 1 desynchronization symbol associated with it}, {channel 2 has 2 desynchronization symbols associated with it}, . . . {channel m has m desynchronization symbols associated with it}. It can also be something else.

The symbols can be random additional symbols with different numbers for each radio channel. In practice, one symbol per channel is sufficient; as an example, a choice of an integer number of symbols or of an offset by symbol fraction can be envisaged without departing from the framework of the invention.

FIG. 2 schematically represents an exemplary communication system according to the invention in which the coding and interleaving functions are shared between m channels. In the transmitter, the system according to the invention comprises a framing module adapted to add the desynchronization symbols whose function is to introduce an offset between the different channels of the multi-carrier wave form, in addition to the pilot and synchronization symbols.

In the transmitter part 200, the binary data {0, 1} of the user goes first into a correction module 201 FEC, then into an interleaver 202 before being demultiplexed 203. The demultiplexed data $b_i^j$ are then transmitted on m channels chi in parallel. The m channels or m paths $ch_1$ . . . $ch_m$ are, for example, channels of 3 KHz bandwidth that may or may not be contiguous.

The data are formatted through a symbol formation module 204 and a scrambling step 205. The next framing module 206 is adapted to insert a number n of desynchronization symbols chosen according to the application. The framing module adds the desynchronization symbols, in addition to the pilot and autobaud symbols.

For example, it will be possible to choose to add to each channel chi, before the initial synchronization preamble, a number d of desynchronization symbols equal to the number i of the channel in the system. The duly constructed data frame is transmitted to modulation means 207, oversampling means 208 and filtering means 209. The following steps consist in transposing them in frequency 210, the transposition frequency Tfm being associated with a channel $ch_m$, then the transposed data will be summed 211. The signal resulting from this sum will be transmitted via the transmission channel 212 and a suitable link 213 to the receiver part 220.

According to another variant, it is possible to introduce zero symbols before the initial synchronization preamble of the frames transmitted on the first channel and a number d of desynchronization symbols equal to m−1 on the channel chm.

In the receiver part 220, the signal received after propagation in the transmission channel is, initially, transposed T'fi in frequency in a module 221 which makes it possible to separate the data on the m channels $ch_m$, then the frequency-transposed data are filtered via a suitable module 222, then are transmitted to a synchronization module 223 before being undersampled 224 and equalized 225. The data are transmitted to a synchronization prediction correction module 226 and reassembled in a parallel/serial buffer 227. The reassembled data are transmitted to a symmetrical deinterleaver 228 of the interleaver 202 of the transmitter part 200. After deinterleaving, the data are transmitted to a correcting decoding module 229 which supplies binary data.

A number of embodiments of the synchronization 223 and synchronization correction 226 modules can be envisaged. A first solution consists in producing an independent synchronization on each of the channels, and in this case, the desynchronization symbols are disregarded by the receiver which will be locked on the preamble. Each channel will then operate as it does nominally in the absence of desynchronization symbols. A second solution, less complex in terms of resources, is to take the synchronization on one of the channels, for example the first or the middle channel, and to supply the synchronization information on the others. The other channels will then compensate this desynchronization either by virtue of their knowledge of the number of desynchronization symbols which have been added to the transmission (implicit knowledge linked to the fact that the TX/RX system uses the desynchronization technique, for example with an offset of p symbols for the channel p), or by using the capacity of the equalizer and of the synchronization correction module to compensate for this delay, which will be able to be seen as a delay linked to the propagation channel.

By using a wave form as described in the Applicant's patent application FR 11 03083, the results of measuring the attenuation coefficients in the synchronized case and the desynchronized case are given in Table 1 as an illustration. The table gives the estimation of the back-off factors for the different configurations from m=1 to 16 channels in a multi-ST4539 approach. These values were obtained on a reference simulation set for a maximum clipping of probability $10^{-6}$.

| Number of channels | Measured gain in terms of back-off factor (dB) | Back-off factor, desynchronized case, compared to single-channel mode (dB) |
| --- | --- | --- |
| 1 | 0.00 | 0.00 |
| 2 | 0.16 | 2.51 |
| 3 | 0.92 | 3.52 |
| 4 | 0.87 | 4.84 |
| 5 | 1.10 | 5.48 |
| 6 | 1.67 | 5.79 |
| 7 | 1.68 | 6.46 |
| 8 | 2.01 | 6.71 |
| 9 | 2.16 | 7.08 |
| 10 | 2.23 | 7.48 |
| 11 | 2.56 | 7.56 |
| 12 | 2.57 | 7.93 |
| 13 | 2.66 | 8.19 |
| 14 | 2.80 | 8.29 |
| 15 | 3.02 | 8.45 |
| 16 | 3.26 | 8.50 |

FIG. 3 schematically represents an example of a more general multi-channel communication system, in which the coding and interleaving operations as described in FIG. 2 are not necessarily shared. The multi-channel system is a system whose channels $ch_m$ employ the same wave form, or at least reference sequences that are identical and positioned for transmission at the same instants. This system is therefore subject to the same problem of increasing the PAPR ratio mentioned above.

In FIG. 3, the system comprises m channels or paths $ch_1$ . . . $ch_m$ transmitting data from one or more transmitters. The symbol data arrive on each channel previously coded, interleaved and "scrambled" if necessary. The steps for inserting desynchronization symbols in each of the channels are performed in the framing module.

In the transmitter part 300 of the system, the symbol data are transmitted to a framing module 301. The framing module is adapted to insert a block of symbols, or a number n of symbols chosen as a function of the channel, for example. The set of symbol data comprising the desynchronization symbols is then transmitted to a modulation module 302, then the modulated data are sent to a frequency filter and frequency transposition module 303. The data from the different channels are summed, module 304, before being transmitted via a propagation channel 305.

In the receiver part 310 of the system, the data from the received signal will be transposed 311 in frequency, which allows for a separation of the data on the m channels $ch_m$, filtered in a module 311, then the frequency-transposed data are filtered via a suitable module 312, then are transmitted to a synchronization module 313 before being demodulated 314. The symbols are then extracted using a suitable module.

The method and the system according to the invention apply notably for links of point-to-point or point-to-multipoint type.

Advantages

The method and the system according to the invention make it possible notably to reduce by 1 to 3 dB the peak factor without destructively modifying the signal, and can even be ultimately combined with other PAPR reducing techniques such as clipping.

The invention applies to the physical layer level in transmission and does not mandatorily require adaptation in reception. In fact, in some cases, it can be likened to a delay linked to a delay on the propagation channel. The system and the method according to the invention are implemented without modifying the standard and therefore without breaking down the interoperability with equipment that is not modified according to the method.

The invention claimed is:

1. A method for reducing a peak factor in a multi-carrier communication system, the data being transmitted on m channels, the method comprising:
   transmitting data, via a transmitter, on m channels in parallel, the data are formatted through a symbol formation module and a scrambling step; and
   introducing a number d of desynchronization symbols at a start of each frame, a framing module adds the desynchronization symbols, in addition to pilot and autobaud symbols, to construct the frame,
   wherein the desynchronization symbols are adapted to introduce an offset between different channels of a multi-carrier wave form,
   wherein the number d is chosen as a function of a transmission channel number m ($ch_m$) concerned,
   wherein the desynchronization symbols introduced are different for the m transmission channels, and
   wherein each constructed frame is associated with a channel $ch_m$ and is summed before being transmitted via one of the m transmission channels and a suitable link to a receiver.

2. The method according to claim 1, wherein the number d of desynchronization symbols equal to 0 are introduced before an initial synchronization preamble of a frame transmitted on a first channel and the number d of desynchronization symbols equal to m−1 are introduced on the transmission channel m ($ch_m$).

3. The method according to claim 1, wherein the desynchronization symbols are introduced with a different number d for each channel.

4. The method according to one claim 1, further comprising realigning, at the receiver, one of the m transmission channels by taking into account the number d of symbols introduced into the frame.

5. The method according to claim 1, further comprising a common step at the transmitter and the receiver of coding and interleaving the data on the m transmission channels.

6. The method according to claim 1, wherein the communications are high frequency (HF) waves of 2 to 30 MHz.

7. A system for reducing a peak factor in a multi-carrier communication system, the system comprising:
   m channels for transmitting data in a form of frames;
   a data transmission subsystem configured to transmit data on the m channels in parallel, the data are formatted through a symbol formation module and a scrambling step; and
   a reception subsystem,
   wherein the data transmission subsystem further comprises at least one module for framing the data adapted to insert a number of symbols at a start of each frame, a framing module adds the desynchronization symbols, in addition to pilot and autobaud symbols, to construct the frame,
   wherein the symbols are adapted to introduce an offset between different channels of a multi-carrier wave form,
   wherein the number of symbols are chosen as a function of a transmission channel number m concerned,
   wherein the desynchronization symbols introduced are different for the m channels, and
   wherein each constructed frame is associated with a channel $ch_m$ and is summed before being transmitted via one of the m transmission channels and a suitable link to the receiver.

8. The system according to claim 7, wherein the reception subsystem further comprises a module adapted to realign each channel by using the number of symbols introduced into a frame.

* * * * *